United States Patent
Sehgal

(10) Patent No.: US 6,618,165 B1
(45) Date of Patent: Sep. 9, 2003

(54) ELECTRONIC FACSIMILE DOCUMENT TRANSPORTATION SYSTEM UTILIZING LOCAL EXCHANGE CARRIERS AND A WIDE-AREA NETWORK

(75) Inventor: Chander Sekhar Sehgal, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/425,783

(22) Filed: Oct. 25, 1999

(51) Int. Cl.[7] ............................................. G06K 15/00
(52) U.S. Cl. ..................... 358/1.15; 358/407
(58) Field of Search ................................. 370/352, 410; 358/1.15, 468, 400, 407, 404, 405

(56) References Cited

U.S. PATENT DOCUMENTS

| | | | | | |
|---|---|---|---|---|---|
| 5,940,479 A | * | 8/1999 | Guy | ......................... | 379/93.01 |
| 6,023,470 A | * | 2/2000 | Lee | ............................. | 370/410 |
| 6,058,169 A | * | 5/2000 | Bramnick | .............. | 379/100.01 |
| 6,353,610 B1 | * | 3/2002 | Bhattacharya | .............. | 370/352 |
| 2001/0015968 A1 | * | 8/2001 | Sicher | ......................... | 370/352 |

* cited by examiner

Primary Examiner—Jerome Grant, II

(57) ABSTRACT

An Internet-based electronic facsimile document transmission and reception system accommodates conventional facsimile (fax) machines and uses store and forwarding rather than real-time facsimile transmission to avoid keeping the originating fax machine (and the telephone line to which it is attached) from being unnecessarily occupied due to delays associated with the Internet. The preferred embodiment also obviates the need for PBXs at the fax machine ends of the system.

17 Claims, 2 Drawing Sheets

Figure 1:
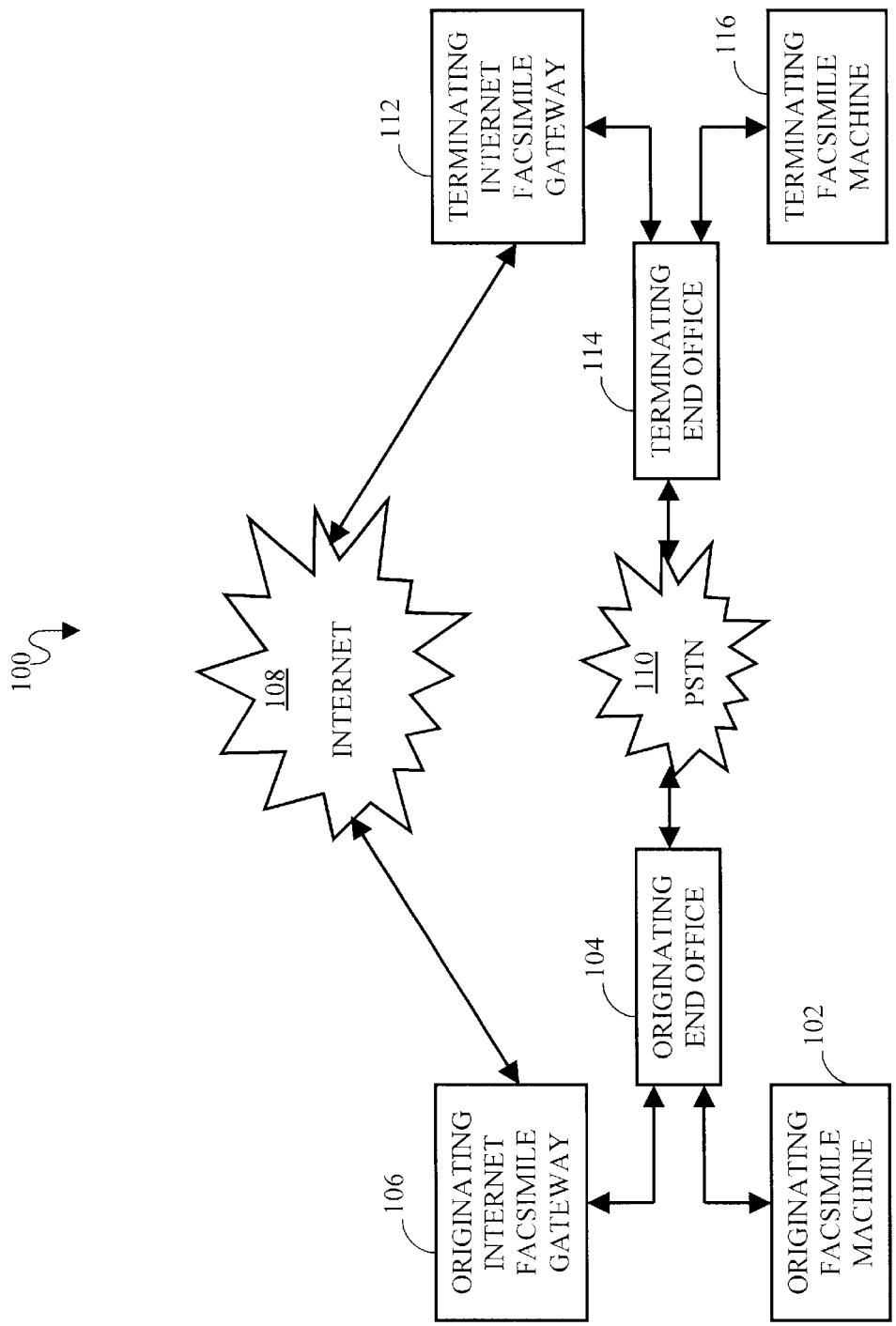

ELECTRONIC FACSIMILE DOCUMENT TRANSPORTATION SYSTEM UTILIZING LOCAL EXCHANGE CARRIERS AND A WIDE-AREA NETWORK

BACKGROUND OF THE INVENTION

1. Field of the Invention

The present invention generally relates to systems for handling facsimile transmissions between conventional facsimile machines. More particularly, the present invention relates to systems and methods for avoiding high toll charges associated with long distance facsimile transmissions.

2. Background

As is well known in the art, facsimile (or "fax") machines transmit and receive digitized images representing scanned documents via built-in modems and the general telephone network. In the transmit mode, a facsimile machine scans a document to be transmitted with a charge coupled device (CCD) array. The control logic in a central microprocessor converts the information from the CCD array into a bit-mapped image of the scanned document and delivers the image to the modem for transmission.

The modem dials the number of the facsimile machine expected to receive the document image. When the facsimile transmission is via a public switched telephone network (PSTN), the transmission is treated as a typical telephone call for billing purposes. Therefore, when a telephone call placed from the telephone line used by the origination facsimile machine would be considered a long distance call, the facsimile transmission will incur a long distance charge.

As the frequency of facsimile transmissions has risen in recent years, so has the interest in reducing the telephone charges associated therewith.

One prior art solution is to equip general-purpose computers with software necessary for transmitting and receiving facsimile transmissions. In the receive mode, the software converts the received image into a document capable of viewing on a screen or reproduction by a printer. The transmit mode of such a computer additionally requires the use of a scanning device for digitizing the document to be transmitted.

In addition to using PSTNs, some general-purpose computers have also begun to transmit and receive electronic documents via the Internet. In such an arrangement, the transmission and reception can be via internet service providers as part of flat-rate monthly services, obviating the need to incur long distance charges through a PSTN.

The use of general-purpose computers as part of facsimile systems via the Internet may eliminate long distance charges, but introduces other problems. For example, computers are required on both the transmission and receiving end. This ignores the large worldwide installed base of conventional facsimile machines that are not integrated into general-purpose computers.

Another approach to using the Internet for facsimile transmissions is the Internet Telephony Server (ITS) developed by Lucent Technologies, Inc., the assignee of this Letters Patent. The ITS system allows a conventional facsimile machine connected to a Private Branch Exchange (PBX) network to dial an origination ITS (also connected to the PBX) and forward facsimile calls to a destination ITS. The link between the origination and destination ITSs is via the Internet using the Transmission Control Protocol/Internet Protocol (TCP/IP), a networking protocol.

The aforementioned approach also has shortcomings. In addition to requiring the use of PBXs, the ITS approach requires all facsimile transmissions to be sent in real time. While long distance charges are avoided, both the transmitting and receiving facsimile machines are "tied up" until after the document(s) has (have) been received.

SUMMARY OF THE INVENTION

In view of the aforementioned problems and deficiencies of the prior art, the present invention provides a method of transporting electronic face simile (fax) documents. The method has several steps including, establishing a telephone link between a first fax machine and a first Local Exchange Carrier (LEC), the first LEC being coupled to a Public Switched Telephone Network (PSTN), transmitting a destination telephone number and an electronic fax document from the first fax machine to the first LEC, and supplying a Wide Area Network (WAN) address for a second Internet Fax Gateway (IFG) to a first IFG, the first IFG being coupled to the first LEC, the second IFG being coupled to a second LEC, and the second LEC also being coupled to the PSTN.

The method also includes the steps of, via the first IFG, receiving the fax document from the first LEC and transmitting the fax document over a WAN to the second IFG using a WAN protocol, and via the second IFG, sending the destination number and the fax document in a form compatible with a second fax machine, to the second LEC. Additional steps include establishing a telephone link between the second LEC and the second fax machine, and transmitting the fax document from the second LEC to the second fax machine.

The present invention also provides a system for transporting electronic fax documents. The system at least includes a first LEC coupled to a PSTN, a first fax machine adapted to establish a telephone link between the first fax machine and the first LEC, and the first fax machine also being adapted to transmit a destination telephone number and an electronic fax document from the first fax machine to the first LEC. The system also includes a first IFG coupled to the first LEC, a second LEC coupled to the PSTN, a second IFG coupled to the second LEC, a WAN coupled to the first IFG and the second IFG, and a second fax machine coupled via a telephone link to the second LEC.

The first LEC is adapted to supply a WAN address for the second IFG, and the first IFG is adapted to receive the fax document from the first LEC and transmit it over the WAN to the second IFG using a WAN protocol. The second IFG is adapted to send the destination number along with the fax document in a form compatible with the second fax machine to the second LEC. The second LEC is adapted to transmit the fax document to the second fax machine.

BRIEF DESCRIPTION OF THE DRAWING FIGURES

Figure 2:
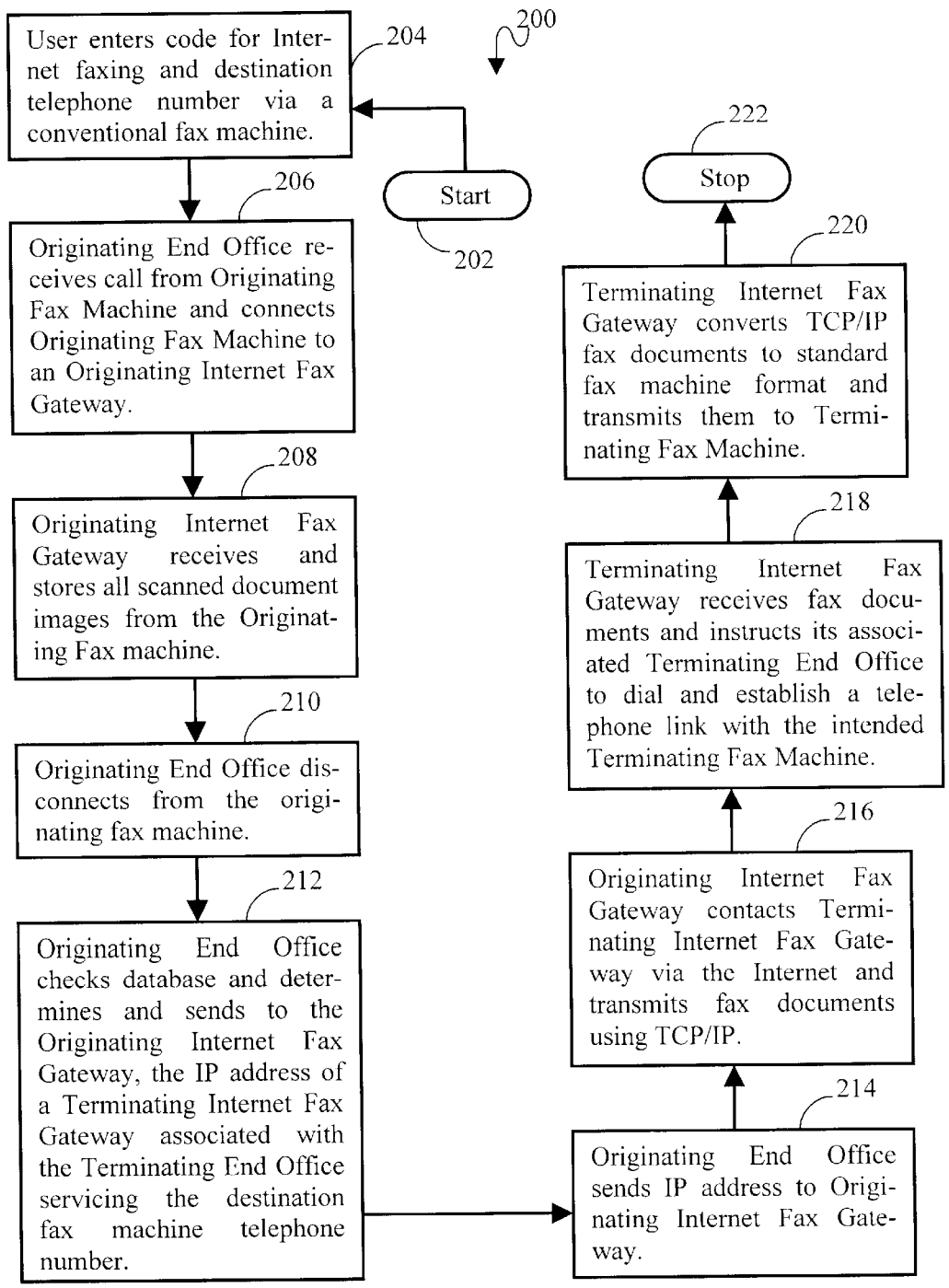

Features and advantages of the present invention will become apparent to those skilled in the art from the description below, with reference to the following drawing figures, in which:

FIG. 1 is a schematic block diagram of the present-inventive Internet-based facsimile transmission and reception system; and FIG. 2 is a flowchart/algorithm detailing the method of the presentinventive Internet-based facsimile transmission and reception system.

DESCRIPTION OF THE PREFERRED EMBODIMENTS

The general components of the Internet-based electronic facsimile document transportation system 100 are illustrated in FIG. 1. Used in this specification, the terms "termination" and "terminating" refer to connecting a call to a destination number. It should be understood that the present invention is compatible with Wide Area Networks (WANs) in general, including the public Internet and private IP networks ("intranets").

The system 100 includes a number of conventional facsimile (fax) machines 102, 116, etc. The originating and terminating end offices, 104 and 114, respectively, are Local Exchange Carriers (LECs) which are connected to a conventional Public Switched Telephone Network (PSTN) 110. In addition to handling fax transmissions as part of the system 100, the end offices 104 and 114 also handle conventional telephone calls.

The fax transportation system 100 is accessed by dialing a special access code from the originating fax machine 102, followed by the destination fax machine telephone number. The access code can be a combination alphanumeric keys such as "*" plus two numbers, for example. All of the end offices in the preferred embodiment contain an Internet Facsimile Gateway address database containing the Internet addresses of all of the Internet Facsimile Gateways (IFGs) in the system. The system IFGs transmit and receive fax documents via the Internet using the TCP/IP.

When the originating end office 104 receives the access code, destination number and the fax document from the originating fax machine 102, it selects the IP address of a terminating IFG 112 associated with the terminating end office 114 servicing the destination telephone line coupled to the terminating fax machine 116. The originating end office 104 sends the IP address of the terminating IFG 112 to the originating IFG 106, whereupon the originating IFG 106 establishes communication with the terminating IFG 112 via the Internet.

The originating IFG also stores the entire fax document received from the originating end office 104 to be forwarded to the terminating IFG 112. Once the originating IFG 106 has stored the fax document, the originating end office 104 dissolves the telephone link with the originating fax machine 102.

Upon receiving the fax document over the Internet, the terminating IFG 112 converts the received fax document to a form recognizable by conventional fax machines and sends the converted fax document and the destination number to the terminating end office 114. In response, the terminating end office 114 establishes a telephone link with the terminating fax machine 116 via the destination number, and transmits the fax document thereto.

FIG. 2 illustrates the general algorithm 200 used by the presentinventive WAN-based fax transportation system to transport electronic fax documents.

After the start 202 of the algorithm 200, a special access code dialed from an originating fax machine indicates to the originating end office servicing the originating telephone line connected to the fax machine, that the user desires to send a fax document via the Internet (Step 204). The originating end office connects the originating fax machine to the originating IFG in order for the originating IFG to receive the fax document and destination telephone number (Step 206).

The originating IFG stores the fax document for subsequent transmission in Step 208. The originating end office disconnects from the originating fax machine in Step 210. In Steps 212 and 214, the originating end office searches the IFG database for the IP address of the IFG associated with the terminating end office servicing the destination telephone number and transmits this information to the originating IFG.

In Step 216, the originating IFG connects to the terminating IFG via the Internet (or other WAN) and transmits the fax document and the destination telephone number (of the telephone line attached to the terminating fax machine) using the TCP/IP. The terminating IFG receives the fax document and instructs the terminating end office to dial the destination telephone number to connect to the terminating fax machine (Step 218).

The terminating IFG converts the fax document received in the TCP/IP format to a conventional fax format and transmits the document to the terminating fax machine to end the process (Steps 220 and 222). In an alternate embodiment of the fax transportation system 100, the originating fax machine 102 is connected to the originating end office via a dedicated fax line. In this case, no access code is needed to transmit facsimile documents via the Internet, as this is the default mode of operation. Instead, the user enters a disable code via the originating fax machine 102 when he/she desires to forego transmitting a fax document over the Internet. For example, when only a local telephone call is needed to transmit a fax document through the PSTN, the user might choose to disable the Internet fax document transporting aspect of the system by dialing the disable code, and transmit the document using the PSTN instead. The fax transmission through the PSTN rather than the Internet might be preferred to avoid a higher charge (e.g., flat transaction fee) associated with using the Internet Fax Gateways compared to a local call charge, notwithstanding that this transaction fee is likely lower than charges associated with long distance calls.

Variations and modifications of the present invention are possible, given the above description. However, all variations and modifications which are obvious to those skilled in the art to which the present invention pertains are considered to be within the scope of the protection granted by this Letters Patent. For example, the order of operations in the algorithm 200 can be different from that shown in FIG. 2 and discussed supra. Also, additional steps can be added without departing from the essence of the present invention.

What is claimed is:

1. A method of transporting electronic facsimile (fax) documents comprising the steps of:

establishing a telephone link between a first fax machine and a first Local Exchange Carrier (LEC), said first LEC being coupled to a Public Switched Telephone Network (PSTN);

transmitting a destination telephone number and an electronic fax document from said first fax machine to said first LEC;

said LEC recognizing a desire to transmit said electronic fax document via a WAN, and based on said recognition, supplying a Wide Area Network (WAN) address for a second Internet Fax Gateway (IFG) to a first IFG, said first IFG being coupled to said first LEC, and said second IFG being coupled to a second LEC, said second LEC being coupled to said PSTN;

via said first IFG, receiving said fax document from said first LEC and transmitting said fax document over a WAN to said second IFG using a WAN protocol;

via said second IFG, sending said fax document in a form compatible with a second fax machine and sending said destination number, to said second LEC;

establishing a telephone link between said second LEC and said second fax machine; and transmitting said fax document from said second LEC to said second fax machine.

2. The method in claim 1, further comprising the steps of:

upon said first IFG receiving said fax document from said first LEC, storing said fax document; and disconnecting the telephone link between said first fax machine and said first LEC upon said first IFG storing said fax document.

3. The method in claim 1, wherein the step of supplying the Wide Area Network address to said first IFG is triggered by an access code recognizable by said first LEC, said access code being dialed from said first fax machine.

4. A method of transporting electronic facsimile (fax) documents comprising the steps of:

establishing a telephone link between a first fax machine and a first Local Exchange Carrier (LEC), said first LEC being coupled to a Public Switched Telephone Network (PSTN);

transmitting a destination telephone number and an electronic fax document from said first fax machine to said first LEC;

said LEC recognizing a desire to transmit said electronic fax document via a WAN, and based on said recognition, supplying a Wide Area Network (WAN) address for a second Internet Fax Gateway (IFG) to a first IFG, said first IFG being coupled to said first LEC, and said second IFG being coupled to a second LEC, said second LEC being coupled to said PSTN;

via said first IFG, receiving said fax document from said first LEC and transmitting said fax document over a WAN to said second IFG using a WAN protocol;

via said second IFG, sending said fax document in a form compatible with a second fax machine and sending said destination number, to said second LEC;

establishing a telephone link between said second LEC and said second fax machine; and transmitting said fax document from said second LEC to said second fax machine, wherein prior to supplying said first IFG with a WAN address of said second IFG, said first LEC searches an IFG address database for a WAN address of an appropriate second IFG.

5. The method in claim 1, wherein said first and second fax machines are not part of general-purpose computer systems.

6. The method in claim 1, wherein said WAN is the public Internet.

7. The method in claim 1, wherein said WAN is a private IP network.

8. A system for transporting electronic facsimile (fax) documents comprising:

a first Local Exchange Carrier (LEC), said first LEC being coupled to a Public Switched Telephone Network (PSTN)

a first fax machine, said first fax machine adapted to establish a telephone link between said first fax machine and said first LEC, and said first fax machine adapted to transmit a destination telephone number and an electronic fax document from said first fax machine to said first LEC;

a first Internet Fax Gateway (IFG) coupled to said first LEC;

a second LEC coupled to said PSTN;

a second IFG coupled to said second LEC;

a Wide Area Network (WAN) coupled to said first IFG and said second IFG; and a second fax machine coupled via a telephone link to said second LEC;

wherein said first LEC is adapted to supply a WAN address for said second IFG, said first IFG is adapted to receive said fax document from said first LEC and transmit it over said WAN to said second IFG using a WAN protocol;

wherein said second IFG is adapted to send said fax document in a form compatible with said second fax machine and send said destination number to said second LEC; and wherein said second LEC is adapted to transmit said fax document to said second fax machine.

9. The system in claim 8, wherein said first IFG is adapted to receive said fax document from said first LEC, and store said fax document, and wherein said first LEC is adapted to disconnect the telephone link between said first fax machine and said first LEC upon said first IFG storing said fax document.

10. The system in claim 8, wherein said first LEC is adapted to establish said telephone link between said first fax machine and said first LEC upon receiving an access code transmitted to said first LEC by said first fax machine.

11. The system in claim 8, wherein said first LEC comprises an IFG address database adapted to be searched by said first LEC, for a WAN address of an appropriate second IFG.

12. The system in claim 8, wherein said first and second fax machines are not part of general-purpose computer systems.

13. The system in claim 8, wherein said WAN is the public Internet.

14. The system in claim 8, wherein said WAN is a private IP network.

15. A method of transporting electronic facsimile (fax) documents comprising the steps of:

(a) establishing a direct telephone link between a first fax machine and a first Local Exchange Carrier (LEC), said first LEC being coupled to a Public Switched Telephone Network (PSTN);

(b) transmitting a destination telephone number and an electronic fax document from said first fax machine to said first LEC;

(c) supplying a Wide Area Network (WAN) address for a second Internet Fax Gateway (IFG) to a first IFG, said first IFG being coupled to said first LEC, and said second IFG being coupled to a second LEC, said second LEC being coupled to said PSTN;

(d) via said first IFG, receiving said fax document from said first LEC and transmitting said fax document over a WAN to said second IFG using a WAN protocol;

(e) via said second IFG, sending said fax document in a form compatible with a second fax machine and sending said destination number, to said second LEC;

(f) establishing a telephone link between said second LEC and said second fax machine; and (g) transmitting said fax document from said second LEC to said second fax machine.

16. A method of transporting electronic facsimile (fax) documents comprising the steps of:

(a) establishing a telephone link between a first fax machine and a first Local Exchange Carrier (LEC), said first LEC being coupled to a Public Switched Telephone Network (PSTN);

(b) transmitting a disable code, a destination telephone number and an electronic fax document from said first fax machine to said first LEC;

(c) based on said disable code transmitting said fax document from said first LEC to a second LEC via said PSTN.

17. A method of transporting electronic facsimile (fax) documents comprising the steps of:

(a) establishing a telephone link between a first fax machine and a first Local Exchange Carrier (LEC), said first LEC being coupled to a Public Switched Telephone Network (PSTN);

(b) transmitting a destination telephone number and an electronic fax document from said first fax machine to said first LEC;

(c) supplying a Wide Area Network (WAN) address for a second Internet Fax Gateway (IFG) to a first IFG, said first IFG being coupled to said first LEC, and said second IFG being coupled to a second LEC, said second LEC being coupled to said PSTN;

(d) via said first IFG, receiving said fax document from said first LEC and transmitting said fax document over a WAN to said second IFG using a WAN protocol;

(e) via said second IFG, sending said fax document in a form compatible with a second fax machine and sending said destination number, to said second LEC;

(f) establishing a telephone link between said second LEC and said second fax machine; and (g) transmitting said fax document from said second LEC to said second fax machine, wherein said first and second fax machines are not part of general purpose computer systems.

* * * * *